(No Model.) 2 Sheets—Sheet 1.

E. REYNOLDS.
REEL ATTACHMENT.

No. 493,518. Patented Mar. 14, 1893.

Witnesses:
J. B. McGirr.
Blanche Fitz-Gerald

Inventor.
Elles Reynolds
By N. W. Fitz Gerald & Bro.
attys (No Model.)   2 Sheets—Sheet 2.
E. REYNOLDS.
REEL ATTACHMENT.
No. 493,518.   Patented Mar. 14, 1893.
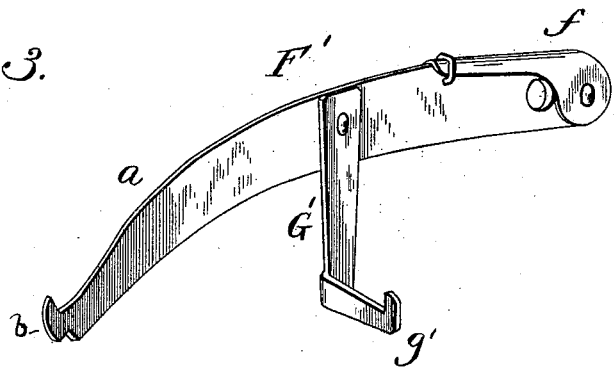
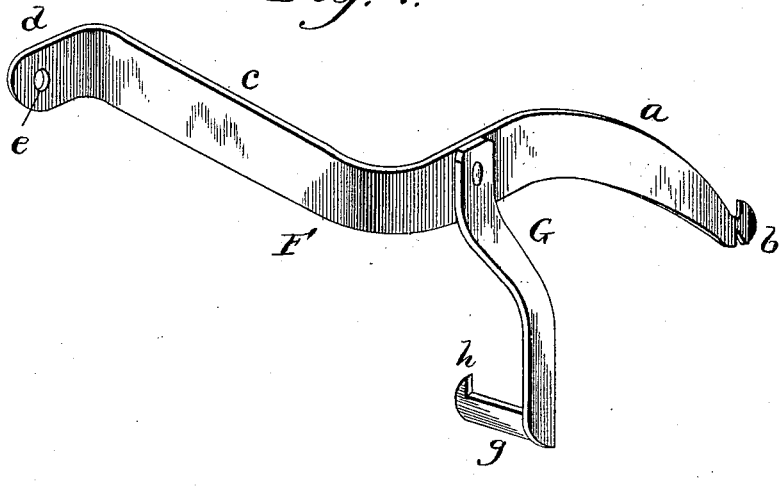
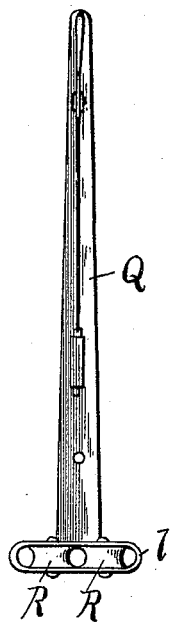
Witnesses:
J. B. McGirr.
Malia Fitz Gerald.
Inventor:
Elles Reynolds.
By N. W. Fitz Gerald & Co.
attys

UNITED STATES PATENT OFFICE.

ELLES REYNOLDS, OF HUBBARD, IOWA.

REEL ATTACHMENT.

SPECIFICATION forming part of Letters Patent No. 493,518, dated March 14, 1893.

Application filed October 1, 1892. Serial No. 447,567. (No model.)

*To all whom it may concern:*

Be it known that I, ELLES REYNOLDS, a citizen of the United States of America, residing at Hubbard, in the county of Hardin and State of Iowa, have invented certain new and useful Improvements in Reel Attachments, of which the following is a specification, reference being had therein to the accompanying drawings.

My invention relates, in general, to a winding reel attachment for traveling vehicles, and more particularly refers to a new and improved check-row wire-reel attachment for corn-planters designed for the special purpose of rewinding the paid out check-wire-cable when so desired.

My invention has for its object to provide a device of this character which will be readily attachable and removable from any existing form of planter, and which shall be simple in its construction, and efficient in operation.

For the attainment of the aforesaid objects, and for other purposes hereinafter enumerated, my improvement comprises certain details of construction, arrangement and combination of parts, all of which will be more fully described hereinafter, and the specific points of novelty in which will be designated in the appended claims.

Figure 1:
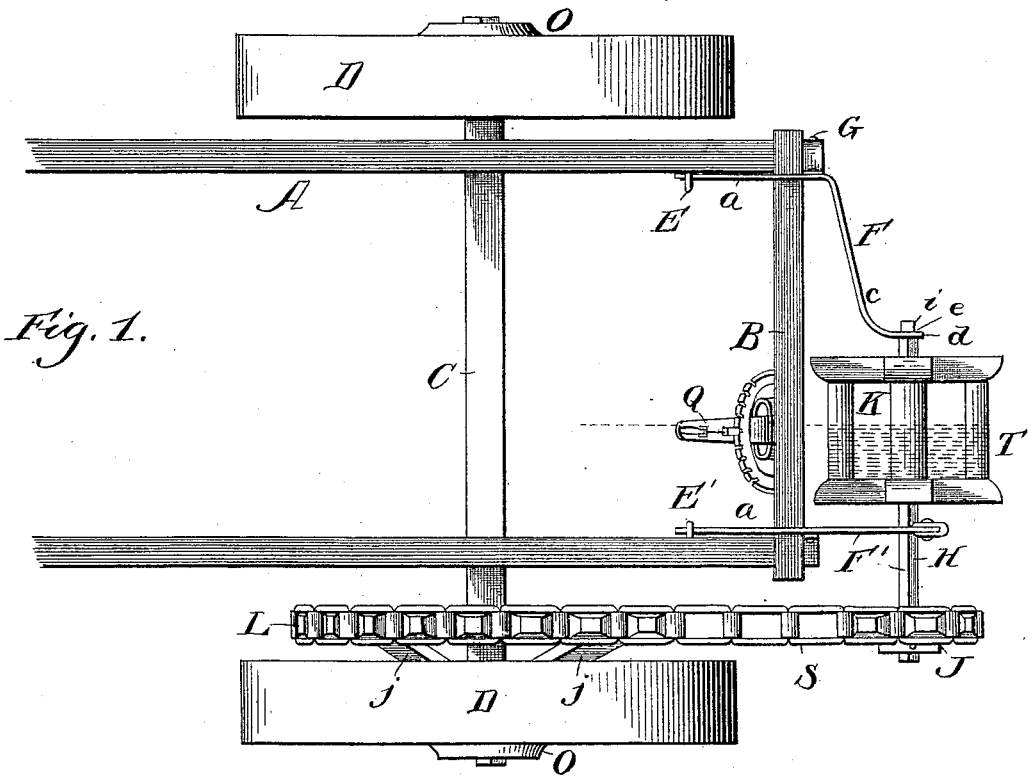
Figure 2:
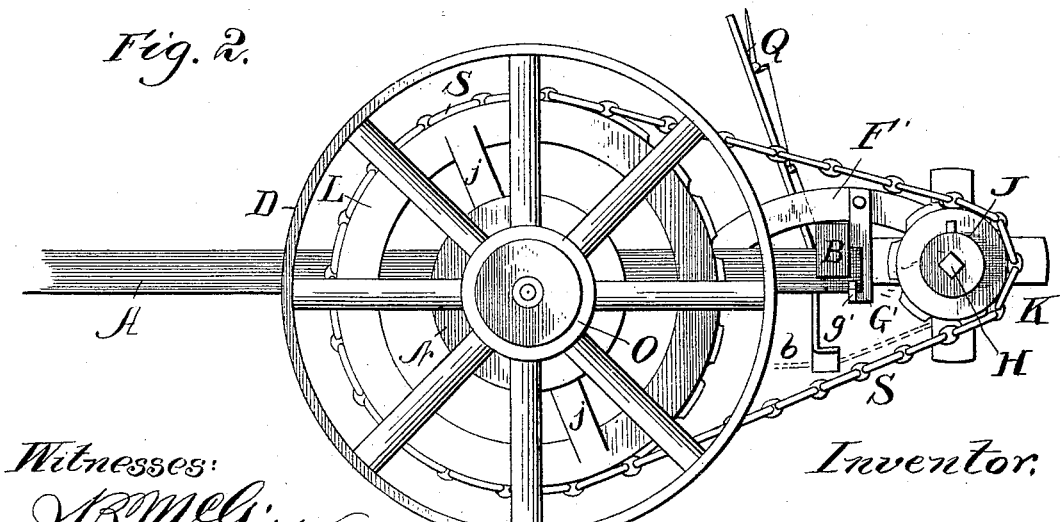

Referring to the accompanying drawings forming a part of the specification: Figure 1 is a top-plan view of a skeleton framework of any approved form of planter equipped with my invention. Fig. 2 is a side elevation showing the device in position rewinding the check-row-cable. Fig. 3 is a detail perspective view of one of the reel-supporting-arms. Fig. 4 is a similar view of the other supporting arm; and Fig. 5 is a detail view of the cable-guiding lever.

Like letters of reference mark the same or corresponding parts in the several views of the drawings.

Before proceeding further I desire to state here that I have not shown the mechanism of the corn-planter, not deeming such illustration necessary. All that I have shown of the corn-planter is the frame-work, axle and drive wheels.

In Figs. 1 and 2, A indicates the side-bars; B the rear cross-bar; C the main axle; and D the drive-wheels.

The device is rendered attachable to the rear portion of the machine by the location of two staples E E', one on each side-bar, near the end thereof, as shown clearly in Fig. 1. These two staples are arranged at diametrically opposite points, and engage and retain the hooked ends of the hanger-arms, F F', respectively. The hanger-arm F (see Fig. 4) is made in one piece of metal of curved irregular shape, and comprises the inclined downwardly curved front portion, $a$, s anning the cross-bar, and terminating at its front in the hook or clip, $b$. The rear portion $c$ is horizontal and is bent at right angles to the front portion and terminates at its rear in the rectangularly bent trunnion arm $d$, provided with a bearing opening, $e$, for the reduced end of the reel shaft. Approximately at the point of juncture between the front and rear portions of the arm F is pivotally attached an irregular plate G, curving out laterally, then extending vertically downward a slight distance, and terminating in a horizontal inwardly extending arm, $g$, bent at right angles to the main portion and having an upwardly bent vertical terminal, $h$. The form and construction of the plate G as a whole are for the purpose of embracing the square rear end of the adjacent side-bar whereby the hanger-arm is rendered immovable and prevented from being displaced. The hanger-arm F' is similarly shaped to the arm F, that is to say, to the front portion, $a$, of the arm F, and terminates at its rear in a journal opening, $f$, encircling a round reduced portion of the reel shaft and being permanently affixed to said shaft. The plate G' pivotally connected midway of the arm F' is similar to the plate G in construction and function with the exception that it is entirely straight in its vertical portion, and the angularly bent horizontal arm, $g'$, is bent outwardly instead of inwardly.

The reel-shaft H is rectangular in cross-section, and reduced at one end into a round bearing, $i$, and carries at its extended other extremity, the small sprocket, J, keyed thereon in alignment with the large sprocket wheel, L on the drive-wheel D.

The winding reel K is rigidly keyed on the shaft H near one end, leaving the extension at the other end for the sprocket J. Between the latter and the adjacent end of the reel the shaft is grooved circumferentially to provide a round bearing portion for the opening, f, in the hanger-arm F', as before stated.

The large sprocket L is provided laterally with a web comprising radial curved inwardly converging arms, j, j, formed integral at their outer extremities to the face of the rim of the sprocket, and terminating at their inner ends in a small concentric ring, N, in a different plane, and fitting around the hub O of the wheel D. Thus the sprocket L is in a different plane from the drive-wheel and in the same plane with the sprocket J.

On the rear cross-bar, B, is the pivoted oscillatory lever Q consisting of an upper handle portion and a lower portion ending in an enlarged open bracket, l, carrying two horizontally disposed guiding sheaves R, R, which guide the check-row cable as it is wound up on the reel. By shifting the lever Q the convolutions of the cable can be directed over the reel to constitute uniform layers. As shown in Fig. 5 of the drawings and also in Fig. 1, the handle-lever Q is provided with a spring actuated catch pawl working in a rack-bar placed on the end cross-bar of the frame-work by which construction said operating lever is held in any desired position without attention on the part of the operator. No further description of these parts is necessary since the construction and function of the device are well-known.

In operation, the sprocket chain S is adjusted over the sprockets J and L, and the wire cable T is placed in winding position on the reel, see Fig. 2. By driving the machine in the proper direction the wire will be readily rewound, being guided by the lever Q in the hand of the operator.

By means of the hanger-arms F F' and the co-operating staples E E', the reel can be detached when necessary.

All the parts are simple, capable of ready adjustment, and not liable to become deranged or inoperative.

Having thus fully described my invention, what I claim is—

1. In a winding reel attachment for corn-planters the combination with the framework and reel, of the reel axle mounted rotatably in a pair of hanger arms, the curved detachable hanger-arms, F, F' supporting the reel axle; the arm F having the curved rear portion, a, provided with the clip, b, and the angularly bent portion, c, and the arm F', having the curved inclined portion, a, terminating in a clip, b, and a rear end portion provided with a journal opening.

2. In a winding reel attachment for corn-planters, the combination with the frame-work and reel, of the reel-axle mounted rotatably in a pair of hanger arms, the curved detachable hanger arms, F, F', supporting the reel axle, the arm F having the curved rear portion, a, provided with the clip, b, and the angularly bent portion, c, and the arm F' having the curved inclined portion, a, terminating in a clip, b, and a rear portion provided with a journal opening, and the staples, E, E', severally fixed to the frame-work to engage and hold the clips, b, b, on the hanger arm.

3. In a winding reel attachment for corn-planters, the combination with the reel and hanger arms detachably secured in staples on the frame-work, of the rear cross-bar of the frame-work, and the plates, G, G' severally attached at their upper ends to the hanger arms F, F', and terminating at their lower extremities in the extension arms, g, g'.

In testimony whereof I affix my signature in presence of two witnesses.

ELLES REYNOLDS.

Witnesses:
 W. C. SWEM,
 D. C. JOHNSON.